US012762716B2

(12) United States Patent
Arai

(10) Patent No.: US 12,762,716 B2
(45) Date of Patent: Oct. 13, 2026

(54) MACHINE LEARNING METHOD AND MACHINE LEARNING APPARATUS

(71) Applicant: SUBARU CORPORATION, Tokyo (JP)

(72) Inventor: Hiroshi Arai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 224 days.

(21) Appl. No.: 18/756,031

(22) Filed: Jun. 27, 2024

(65) Prior Publication Data

US 2025/0014193 A1 Jan. 9, 2025

(30) Foreign Application Priority Data

Jul. 6, 2023 (JP) ................................ 2023-111128

(51) Int. Cl.
*G06T 7/246* (2017.01)
*G06V 10/776* (2022.01)
*G06V 20/58* (2022.01)

(52) U.S. Cl.
CPC ............ *G06T 7/246* (2017.01); *G06V 10/776* (2022.01); *G06V 20/58* (2022.01); *G06T 2207/20081* (2013.01); *G06T 2207/30252* (2013.01)

(58) Field of Classification Search
CPC ...... G06V 10/82; G06V 10/776; G06V 20/58; G06T 7/246; G06T 2207/30252; G06T 2207/20084; G06T 2207/20081
See application file for complete search history.

(56) References Cited

U.S. PATENT DOCUMENTS

2022/0301182 A1* 9/2022 Mahjourian ......... G06V 20/584

OTHER PUBLICATIONS

Hu, Anthony, et al. "FIERY: Future Instance Prediction in Bird's-Eye View from Surround Monocular Cameras." arXiv preprint arXiv: 2104.10490v3 (2021). (Year: 2021).*
Gonzalez, David Sierra. Towards human-like prediction and decision-making for automated vehicles in highway scenarios. Doctoral dissertation, Université Grenoble Alpes, 2019. (Year: 2019).*
Reza Mahjourian, Jinkyu Kim, Yuning Chai, Mingxing Tan, Ben Sapp, Dragomir Anguelov, "Occupancy Flow Fields for Motion Forecasting in Autonomous Driving", [online], Waymo LLC, [retrieved on Jun. 22, 2023], Internet <URL: https://arxiv.org/pdf/2203.03875.pdf>.

* cited by examiner

*Primary Examiner* — Tracy Mangialaschi
(74) *Attorney, Agent, or Firm* — Rimon P.C.

(57) ABSTRACT

A machine learning method includes: inputting pieces of position data to a machine learning model configured to receive the pieces of position data indicating a position of an object at respective first points in time, and output occupancy data and flow data, the occupancy data indicating occupancy probability of the object at a second point in time, the flow data indicating a velocity vector of the object at the second point in time; generating second ground truth occupancy data by performing a process of expanding an occupancy region of the object on first ground truth occupancy data at the second point in time; calculating a loss parameter, based on the occupancy data, the second ground truth occupancy data, the flow data, and ground truth flow data at the second point in time; and updating the machine learning model, based on the loss parameter.

10 Claims, 11 Drawing Sheets

MACHINE LEARNING METHOD AND MACHINE LEARNING APPARATUS

CROSS-REFERENCE TO RELATED APPLICATIONS

The present application claims priority from Japanese Patent Application No. 2023-111128 filed on Jul. 6, 2023, the entire contents of which are hereby incorporated by reference.

BACKGROUND

The disclosure relates to a machine learning method and a machine learning apparatus that predict a position and a velocity of a surrounding object.

There is a technique of predicting a future position and a future velocity of a surrounding object using a technique of machine learning. For example, Reza Mahjourian, Jinkyu Kim, Yuning Chai, Mingxing Tan, Ben Sapp, Dragomir Anguelov, "Occupancy Flow Fields for Motion Forecasting in Autonomous Driving", [online], Waymo LLC, [retrieved on Jun. 22, 2023], Internet <URL: https://arxiv.org/pdf/2203.03875.pdf> discloses a technique that predicts a position and a velocity of a surrounding object using a technique referred to as an occupancy flow.

SUMMARY

An aspect of the disclosure provides a machine learning method including: inputting pieces of position data to a machine learning model, the machine learning model being configured to receive the pieces of position data indicating a position of an object at respective first points in time, and output occupancy data and flow data, the occupancy data including map data indicating occupancy probability of the object at a second point in time later than the first points in time, the flow data including map data indicating a velocity vector of the object at the second point in time; generating second ground truth occupancy data by performing a process of expanding an occupancy region of the object on first ground truth occupancy data, the first ground truth occupancy data including ground truth data of map data indicating occupancy probability of the object at the second point in time; calculating a loss parameter, based on the occupancy data outputted from the machine learning model, the second ground truth occupancy data, the flow data outputted from the machine learning model, and ground truth flow data including ground truth data of map data indicating a velocity vector of the object at the second point in time; and updating the machine learning model, based on the loss parameter.

An aspect of the disclosure provides a machine learning apparatus including a storage and a processor. The storage is configured to store a data set including pieces of position data indicating a position of an object at respective first points in time, first ground truth occupancy data including ground truth data of map data indicating occupancy probability of the object at a second point in time later than the first points in time, and ground truth flow data including ground truth data of map data indicating a velocity vector of the object at the second point in time. The processor is configured to perform a machine learning process, based on the data set. The processor is configured to: input the pieces of position data to a machine learning model configured to receive the pieces of position data and output occupancy data and flow data, the occupancy data including map data indicating occupancy probability of the object at the second point in time, the flow data including map data indicating a velocity vector of the object at the second point in time; generate second ground truth occupancy data by performing a process of expanding an occupancy region of the object on the first ground truth occupancy data; calculate a loss parameter, based on the occupancy data outputted from the machine learning model, the second ground truth occupancy data, the flow data outputted from the machine learning model, and the ground truth flow data; and update the machine learning model, based on the loss parameter.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
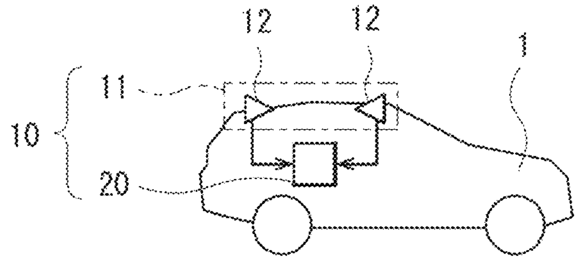
FIG. 1 is an explanatory diagram illustrating a configuration example of a surrounding environment recognition device according to one example embodiment of the disclosure.

In a technique of predicting a future position and a future velocity of a surrounding object using a technique of machine learning, it is desired that a position and a velocity of the surrounding object be predicted with high prediction accuracy, and further improvement in the prediction accuracy is expected.

It is desirable to provide a machine learning method and a machine learning apparatus that make it possible to improve accuracy in predicting a position and a velocity of an object.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

EXAMPLE EMBODIMENT

Configuration Example

Figure 2:
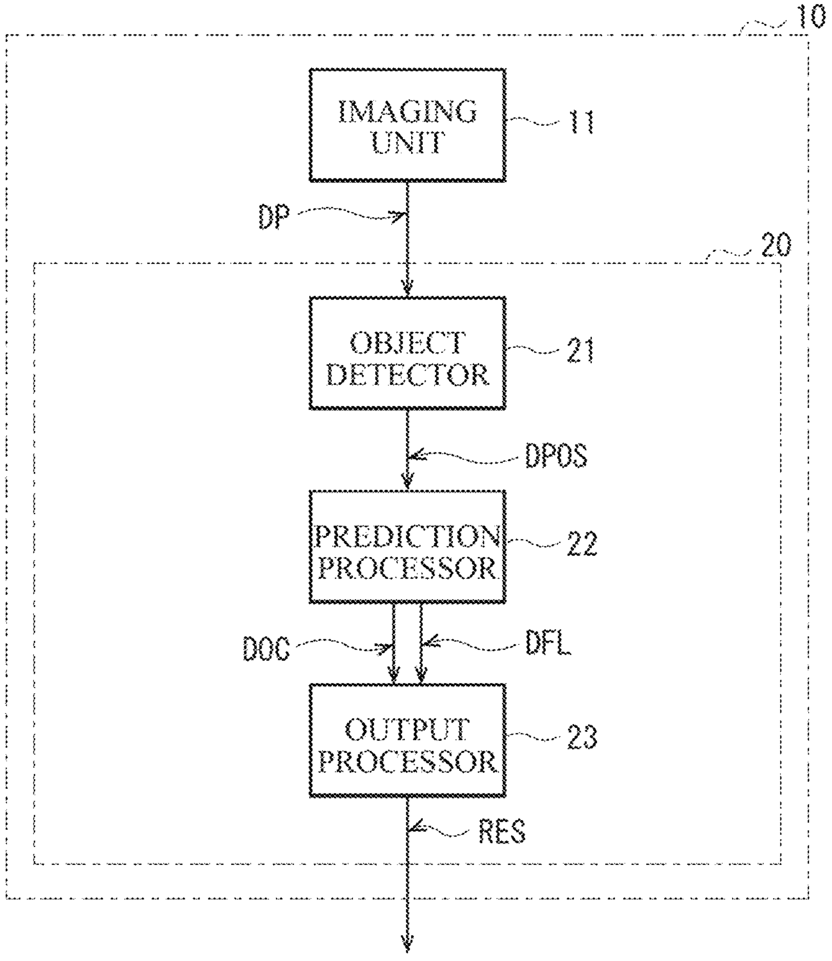
FIG. 2 is a block diagram illustrating a configuration example of the surrounding environment recognition device illustrated in FIG. 1.

FIGS. 1 and 2 illustrate a configuration example of a surrounding environment recognition device 10 that performs processing using a machine learning model generated by a machine learning method according to an example embodiment. In this example, the surrounding environment recognition device 10 may be mounted on a vehicle 1. The vehicle 1 may be any vehicle such as an automobile. The surrounding environment recognition device 10 may be configured to detect a position of an object such as a vehicle or a pedestrian around the vehicle 1, and predict a future position and a future velocity of the object. The surrounding environment recognition device 10 may include an imaging unit 11 and an image processor 20.

The imaging unit 11 may be configured to capture an image of the object around the vehicle 1. In this example, the imaging unit 11 may include imagers 12. Each of the imagers 12 may capture an image of a region ahead, behind, or sideways of the vehicle 1, for example. Note that this example is a non-limiting example, and the imaging unit 11 may include one imager 12 that captures an image of a region ahead of the vehicle 1, for example. Each of the imagers 12 may include, for example, an image sensor and a lens. The imagers 12 may each generate a captured image by performing an imaging operation in synchronization with each other. The imaging unit 11 may be configured to supply image data DP including the captured image generated by each of the imagers 12 to the image processor 20.

The image processor 20 may be configured to detect a position of the object around the vehicle 1, based on the captured images included in the image data DP, and predict the future position and the future velocity of the object. For example, based on a result of the processing of the image processor 20, the vehicle 1 may be configured to allow a travel control of the vehicle 1 to be performed or information on the recognized object to be displayed on a console monitor. The image processor 20 may include, for example, a central processing unit (CPU) that executes a program, a random-access memory (RAM) that temporarily stores processing data, and a read-only memory (ROM) that stores the program. The image processor 20 may include an object detector 21, a prediction processor 22, and an output processor 23.

The object detector 21 may be configured to detect an object around the vehicle 1, based on captured images related to the same capturing point in time generated by the respective imagers 12. The object detector 21 may be configured to generate position data DPOS, based on a result of the detection of the object around the vehicle 1. The position data DPOS may be map data indicating a position of the object with reference to a position of the vehicle 1.

Figure 3:
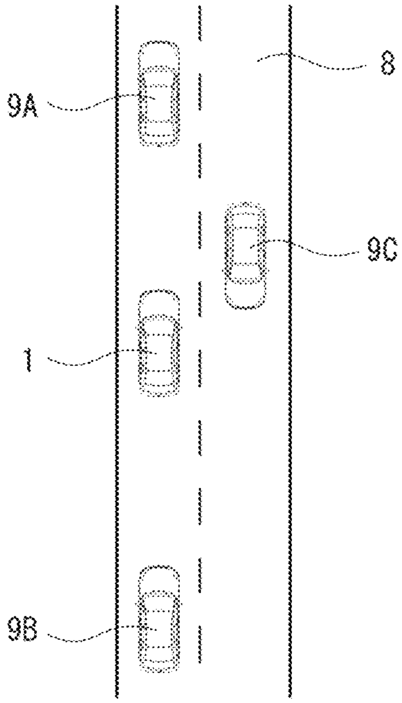
FIG. 3 is an explanatory diagram illustrating an example of surroundings of a vehicle illustrated in FIG. 1.
Figure 4:
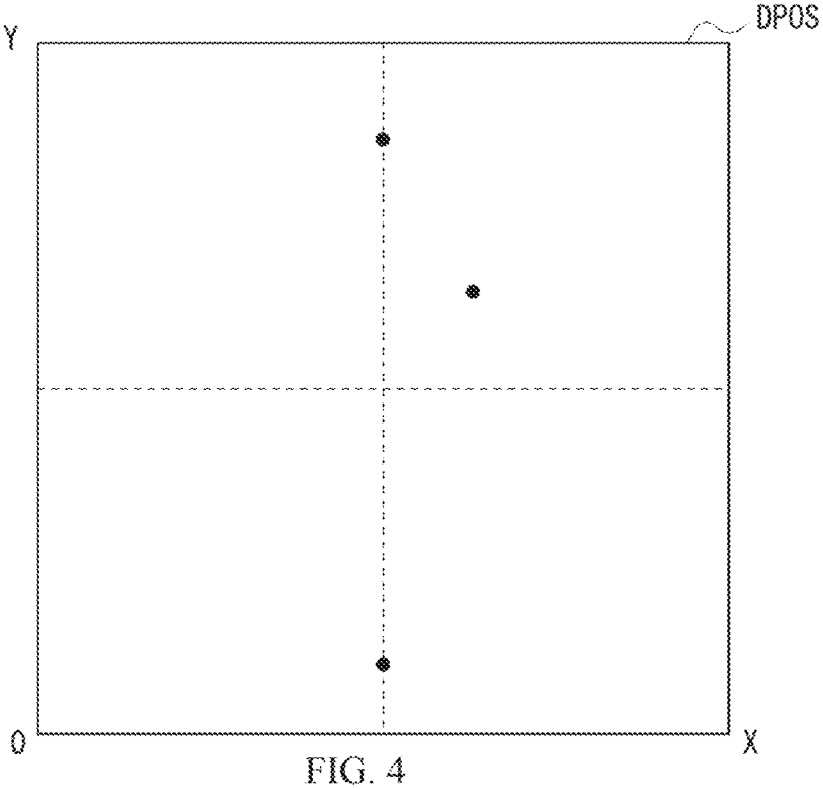
FIG. 4 is an explanatory diagram illustrating an example of position data illustrated in FIG. 2.

FIG. 3 illustrates an example of positions of objects around the vehicle 1. FIG. 4 illustrates an example of the position data DPOS. In this example, a description is given of an example in which vehicles travel on a left side of a middle of the traveling path, which may be referred to as a left-hand traffic; however, this example is a non-limiting example. Any embodiment of the disclosure may be applied to an example in which vehicles travel on a right side of the middle of the traveling path, which may be referred to as a right-hand traffic.

As illustrated in FIG. 3, the vehicle 1 may be traveling on a traveling path 8. In a lane in which the vehicle 1 is traveling, a vehicle 9A that is a preceding vehicle may be traveling ahead of the vehicle 1, and a vehicle 9B that is a subsequent vehicle may be traveling behind the vehicle 1. Further, in a lane that differs from the lane in which the vehicle 1 is traveling, a vehicle 9C that is an oncoming vehicle may be traveling. The object detector 21 may detect positions of the vehicles 9A to 9C, based on the captured images related to the same capturing point in time generated by the imagers 12. The object detector 21 may generate the position data DPOS (FIG. 4) indicating the positions of the vehicles 9A to 9C. A horizontal direction X in the position data DPOS may be a width direction of the vehicle 1, and a vertical direction Y in the position data DPOS may be a length direction of the vehicle 1. Three points illustrated in FIG. 4 may indicate the positions of the vehicles 9A to 9C with reference to the position of the vehicle 1.

The prediction processor 22 (FIG. 2) may be configured to generate predicted occupancy data DOC and predicted flow data DFL by predicting the future positions and the future velocities of the objects using the machine learning model, based on the position data DPOS. The machine learning model may be, for example, a deep neural network (DNN).

Figure 5:
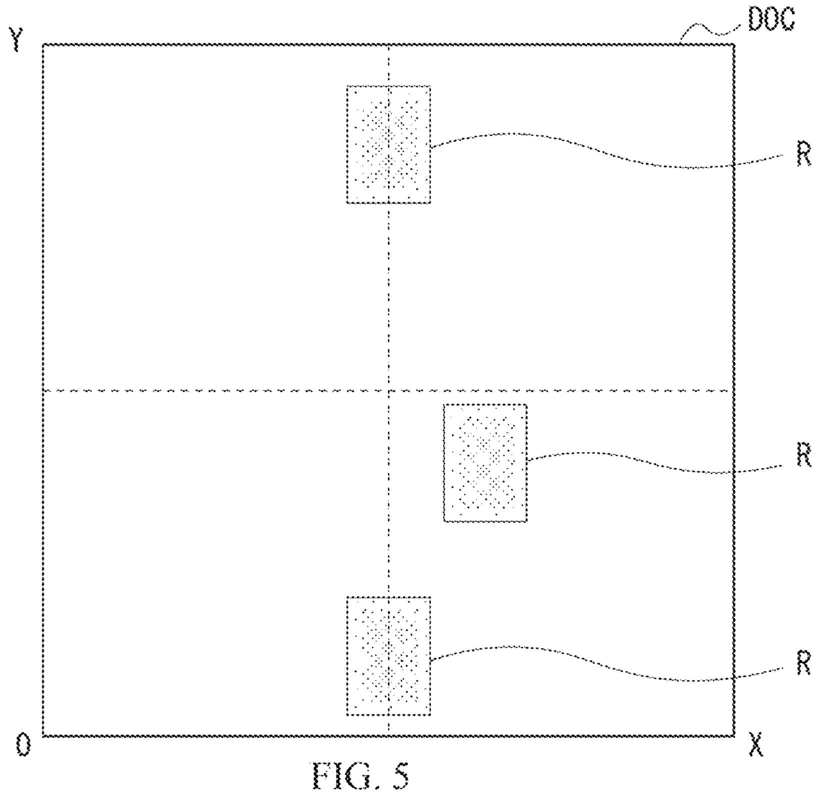
FIG. 5 is an explanatory diagram illustrating an example of predicted occupancy data illustrated in FIG. 2.

FIG. 5 illustrates an example of the predicted occupancy data DOC. The predicted occupancy data DOC may be map data indicating occupancy probabilities of the objects at a certain point in time in the future with reference to the position of the vehicle 1. A horizontal direction X in the predicted occupancy data DOC may be the width direction of the vehicle 1, and a vertical direction Y in the predicted occupancy data DOC may be the length direction of the vehicle 1. FIG. 5 illustrates three predicted occupancy regions R that are regions that may be occupied by the vehicles 9A to 9C at the certain point in time in the future. The occupancy probabilities of the three predicted occupancy regions R may take, for example, values of "0" or higher and "1" or lower. The value "1" may indicate a high occupancy probability, and "0" may indicate a low occupancy probability. In FIG. 5, the closer the occupancy probability is to "1", the darker the shading may be used for illustration.

Figure 6:
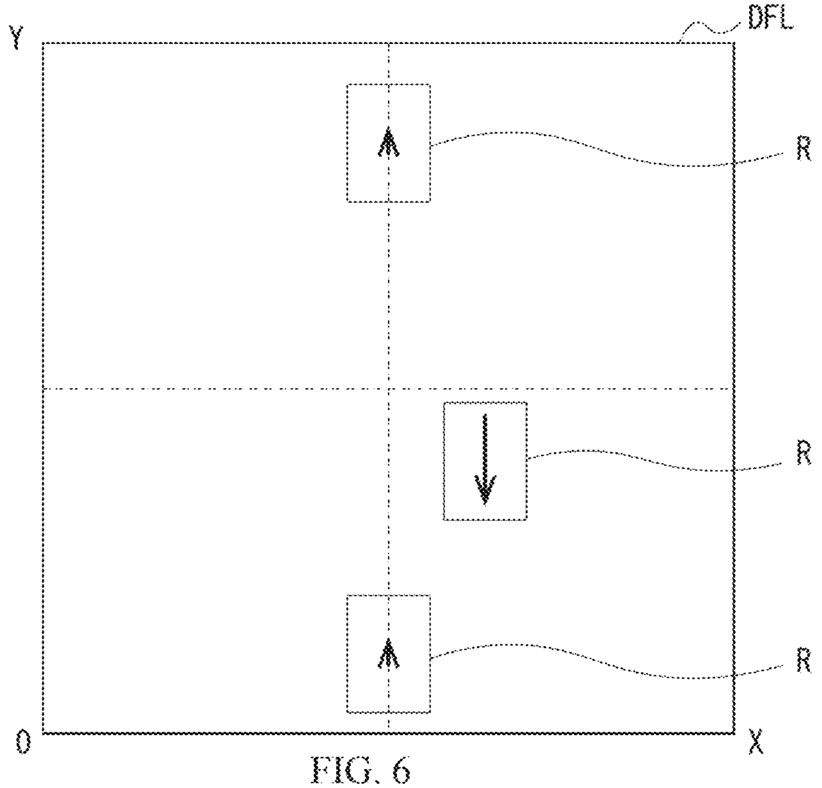
FIG. 6 is an explanatory diagram illustrating an example of predicted flow data illustrated in FIG. 2.

FIG. 6 illustrates an example of the predicted flow data DFL. The predicted flow data DFL may be map data indicating velocity vectors of the objects at the certain point in time in the future with reference to the position of the vehicle 1. A horizontal direction X in the predicted flow data DFL may be the width direction of the vehicle 1, and a vertical direction Y in the predicted flow data DFL may be the length direction of the vehicle 1. The directions of the arrows in the three predicted occupancy regions R may indicate the velocity vectors of the vehicles 9A to 9C with reference to the position of the vehicle 1. For example, the directions of the arrows in the three predicted occupancy regions R may indicate moving directions of the vehicles 9A to 9C with reference to the position of the vehicle 1. The length of the arrows in the three predicted occupancy regions R may indicate a magnitude of the velocity with reference to the position of the vehicle 1.

Figure 7:
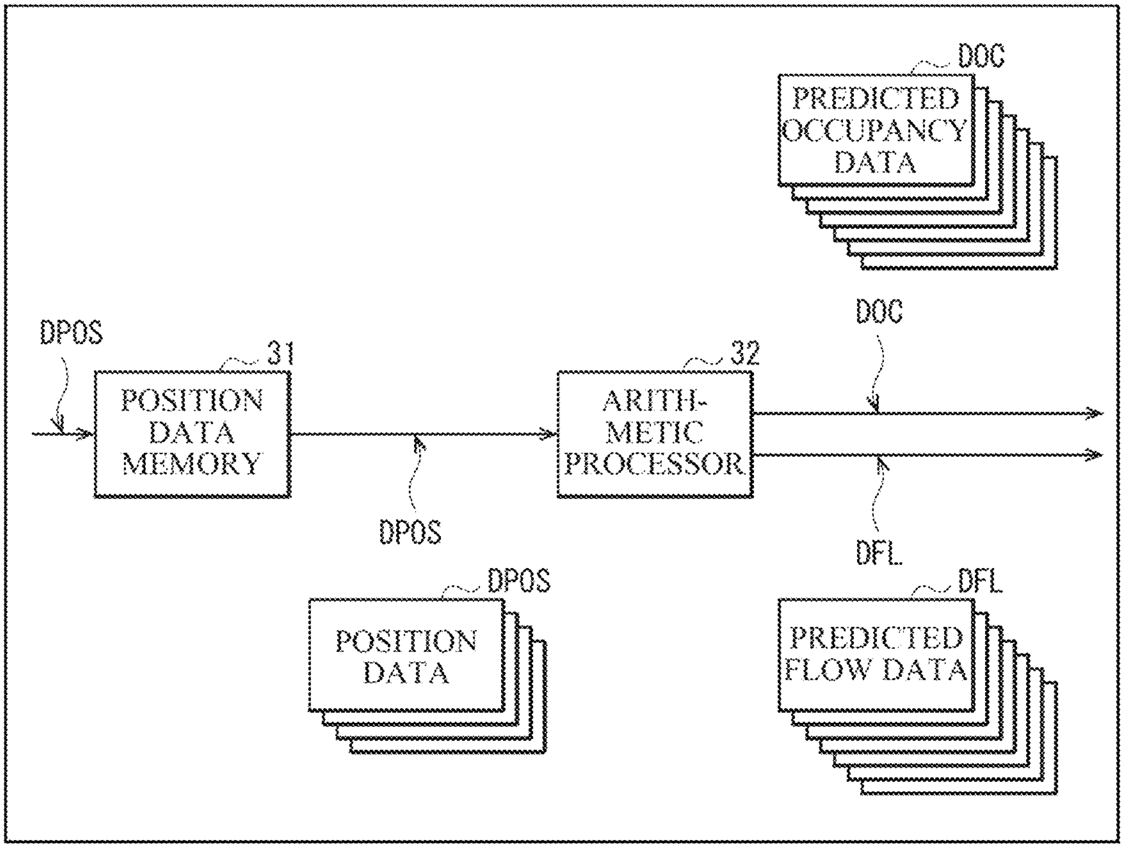
FIG. 7 is a block diagram illustrating a configuration example of a prediction processor illustrated in FIG. 2.

FIG. 7 illustrates a configuration example of the prediction processor 22. The prediction processor 22 may include a position data memory 31 and an arithmetic processor 32.

The position data memory 31 may be configured to store the position data DPOS supplied from the object detector 21 for a predetermined period. As a result, pieces of position data DPOS related to capturing points in time may be accumulated in the position data memory 31.

The arithmetic processor 32 may be configured to generate pieces of predicted occupancy data DOC related to points in time in the future and pieces of predicted flow data DFL related to the points in time in the future using the machine learning model, based on the pieces of position data DPOS related to the capturing points in time. For example, the arithmetic processor 32 may be configured to generate 80 pieces of predicted occupancy data DOC and 80 pieces of predicted flow data DFL at 80 points in time in the future, based on eight pieces of position data DPOS at eight points in time in the past.

The output processor 23 (FIG. 2) may be configured to generate a prediction result RES, based on the pieces of predicted occupancy data DOC and the pieces of predicted flow data DFL supplied from the prediction processor 22.

The machine learning model to be used in the prediction processor 22 may be generated in advance by a machine learning process, and set in the prediction processor 22 of the vehicle 1. Next, a machine learning apparatus 40 that generates the machine learning model will be described.

<Machine Learning Apparatus 40>

Figure 8:
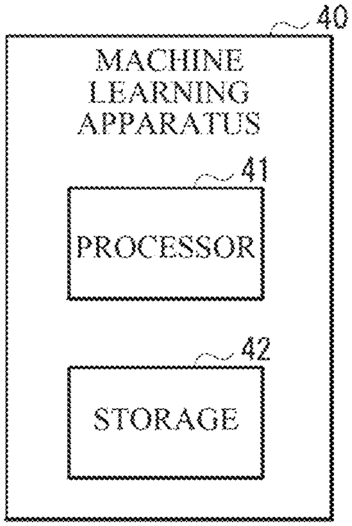
FIG. 8 is a block diagram illustrating a configuration example of a machine learning apparatus that generates a machine learning model to be used by the prediction processor illustrated in FIG. 2.

FIG. 8 illustrates a configuration example of the machine learning apparatus 40. The machine learning apparatus 40 may be, for example, a personal computer, or any device having capability to execute the machine learning. The machine learning apparatus 40 includes a processor 41 and a storage 42.

The processor 41 may include, for example, a CPU and a RAM, and may be configured to generate the machine learning model by performing the machine learning process using data sets DS supplied from the storage 42.

The storage 42 may include, for example, a solid state drive (SSD) and a hard disk drive (HDD). The storage 42 is configured to store the data sets DS. The data sets DS may be prepared in advance by an engineer, for example, and stored in the storage 42. The machine learning apparatus 40 may be configured to generate the machine learning model by performing the machine learning process using the data sets DS.

Figure 9:
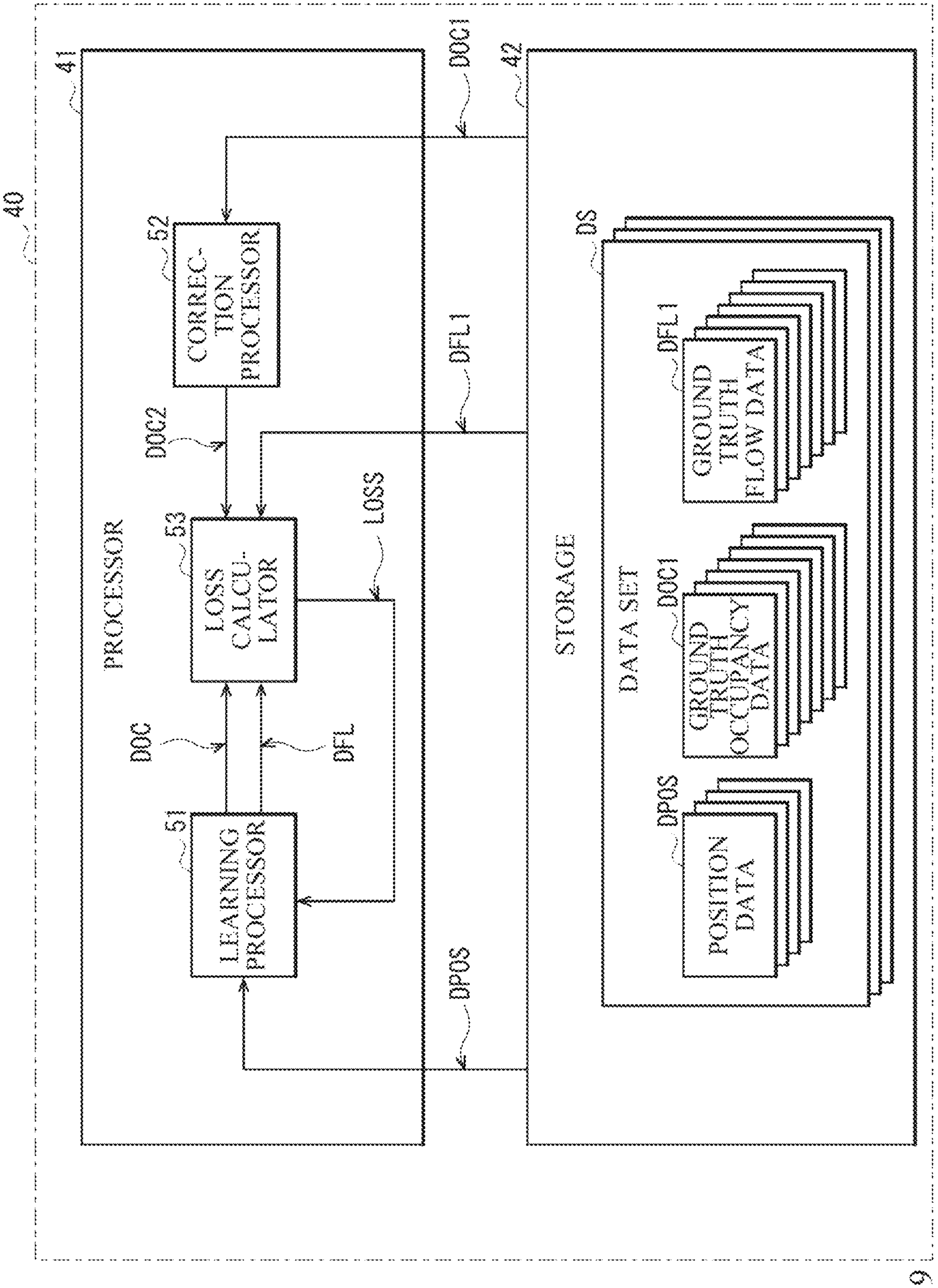
FIG. 9 is a block diagram illustrating a configuration example of a processor illustrated in FIG. 8.

FIG. 9 illustrates a configuration example of the processor 41. The processor 41 may include a learning processor 51, a correction processor 52, and a loss calculator 53. Each of the data sets DS stored in the storage 42 may include the pieces of position data DPOS related to points in time in the past, pieces of ground truth occupancy data DOC1 related to points in time in the future, and pieces of ground truth flow data DFL1 related to the points in time in the future. The ground truth occupancy data DOC1 may be ground truth data of occupancy data corresponding to the pieces of position data DPOS included in the data set DS. The occupancy probabilities in the ground truth occupancy data DOC1 may be "0" or "1". The ground truth flow data DFL1 may be ground truth data of flow data corresponding to the pieces of position data DPOS included in the data set DS.

The learning processor 51 may be configured to generate pieces of predicted occupancy data DOC and pieces of predicted flow data DFL using the machine learning model being trained, based on the pieces of position data DPOS included in the data set DS. Further, the learning processor 51 may be configured to update the machine learning model by performing a backpropagation process, based on a loss parameter LOSS supplied from the loss calculator 53.

The correction processor 52 may be configured to generate pieces of ground truth occupancy data DOC2 by performing a correction process of expanding an occupancy region (a ground truth occupancy region) of the object, based on the pieces of ground truth occupancy data DOC1 included in the data set DS.

Figure 10A:
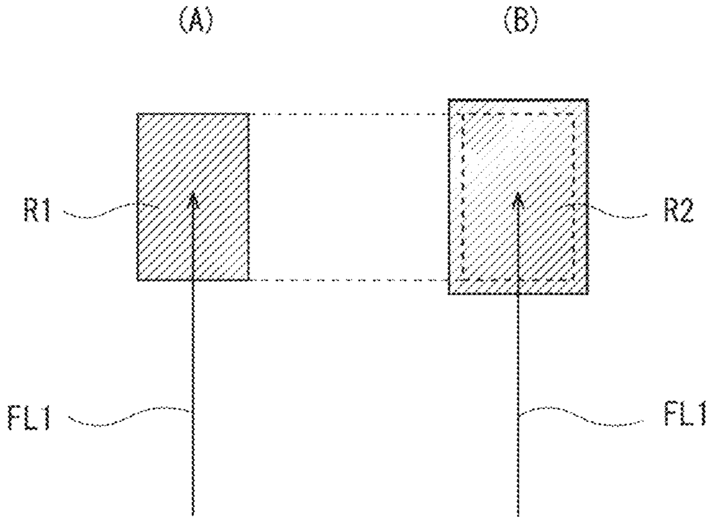
FIG. 10A is an explanatory diagram illustrating an operation example of a correction processor illustrated in FIG. 9.

FIG. 10A illustrates an operation example of the correction processor 52, where (A) illustrates an occupancy region (a ground truth occupancy region R1) in the ground truth occupancy data DOC1, and (B) illustrates a ground truth occupancy region R2 in the ground truth occupancy data DOC2. FIG. 10A also illustrates a velocity vector FL1 in the ground truth flow data DFL1. In this example, the correction processor 52 may expand the ground truth occupancy region R1 included in the ground truth occupancy data DOC1 by a predetermined width in all directions. In this manner, the correction processor 52 may generate the ground truth occupancy region R2 that is larger than the ground truth occupancy region R1. The occupancy probability in the ground truth occupancy region R1 may be "1", and the occupancy probability in the ground truth occupancy region R2 may be "1".

Figure 10B:
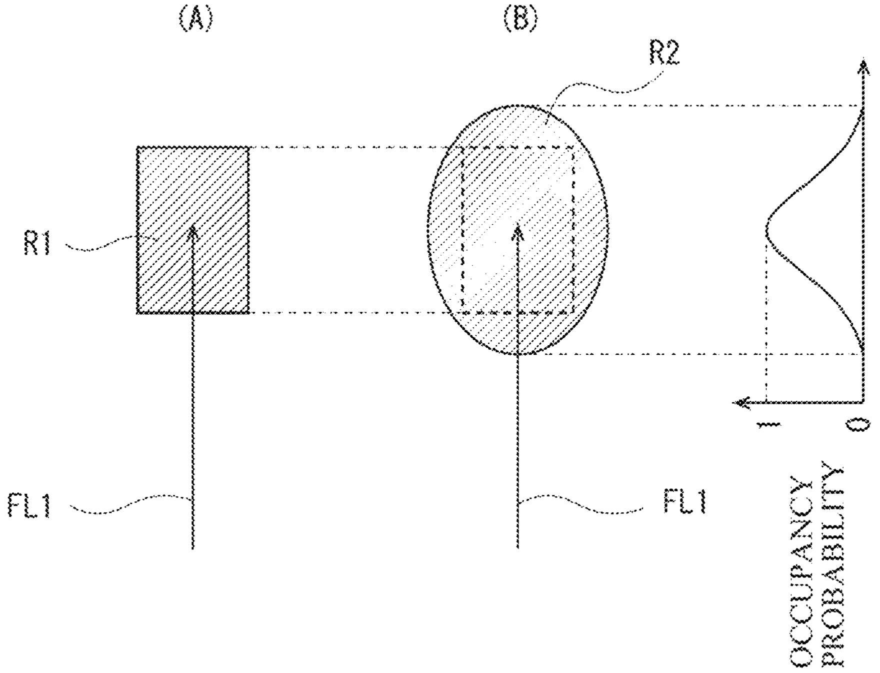
FIG. 10B is an explanatory diagram illustrating another operation example of the correction processor illustrated in FIG. 9.

FIG. 10B illustrates another operation example of the correction processor 52, where (A) illustrates the ground truth occupancy region R1 in the ground truth occupancy data DOC1, and (B) illustrates the ground truth occupancy region R2 in the ground truth occupancy data DOC2. In this example, the correction processor 52 may expand the ground truth occupancy region R1 by performing a blurring process on the ground truth occupancy data DOC1 using Gaussian blur. In this manner, the correction processor 52 may generate the ground truth occupancy region R2 that is larger than the ground truth occupancy region R1. The occupancy probability in the ground truth occupancy region R2 may take a value of "0" or higher and "1" or lower.

In this manner, the correction processor 52 may be configured to generate the ground truth occupancy region R2 by expanding the ground truth occupancy region R1 included in the ground truth occupancy data DOC1, based on the ground truth occupancy data DOC1, and generate the ground truth occupancy data DOC2 including the ground truth occupancy region R2.

The loss calculator 53 may be configured to calculate the loss parameter LOSS, based on the pieces of predicted occupancy data DOC supplied from the learning processor 51, the pieces of ground truth occupancy data DOC2 supplied from the correction processor 52, the pieces of predicted flow data DFL supplied from the learning processor 51, and the pieces of ground truth flow data DFL1 supplied from the storage 42.

The loss calculator 53 may calculate loss parameters $L_O$, $L_F$, and $L_W$ using the following equations EQ1 to EQ4, and calculate the loss parameter LOSS, based on the loss parameters $L_O$, $L_F$, and $L_W$.

$$L_O = \sum_{t=1}^{Tpred} \sum_{x=0}^{w-1} \sum_{y=0}^{h-1} H(OC_t(x, y), OC2_t(x, y)) \quad \text{(EQ1)}$$

$$L_F = \sum_{t=1}^{Tpred} \sum_{x=0}^{w-1} \sum_{y=0}^{h-1} \|FL_t(x, y) - FL1_t(x, y)\|_1 OC2_t(x, y) \quad \text{(EQ2)}$$

$$W_t = FL_t \cdot W_{t-1} \quad \text{(EQ3)}$$

$$L_w = \sum_{t=1}^{Tpred} \sum_{x=0}^{w-1} \sum_{y=0}^{h-1} H(W_t(x, y)OC_t(x, y), OC2_t(x, y)) \quad \text{(EQ4)}$$

In the equations, $OC_t$ (x, y) may represent the occupancy probability at coordinates x, y in the predicted occupancy data DOC related to time t, and $OC2_t$ (x, y) may represent the occupancy probability at the coordinates x, y in the ground truth occupancy data DOC2 related to the time t. $FL_t$ (x, y) may represent the velocity vector at the coordinates x, y in the predicted flow data DFL at the time t. $FL1_t$ (x, y) may represent the velocity vector at the coordinates x, y in the ground truth flow data DFL1 at the time t. $W_{t-1}$ may represent the occupancy probability at the coordinates x, y in the occupancy data related to time t−1.

Figure 11:
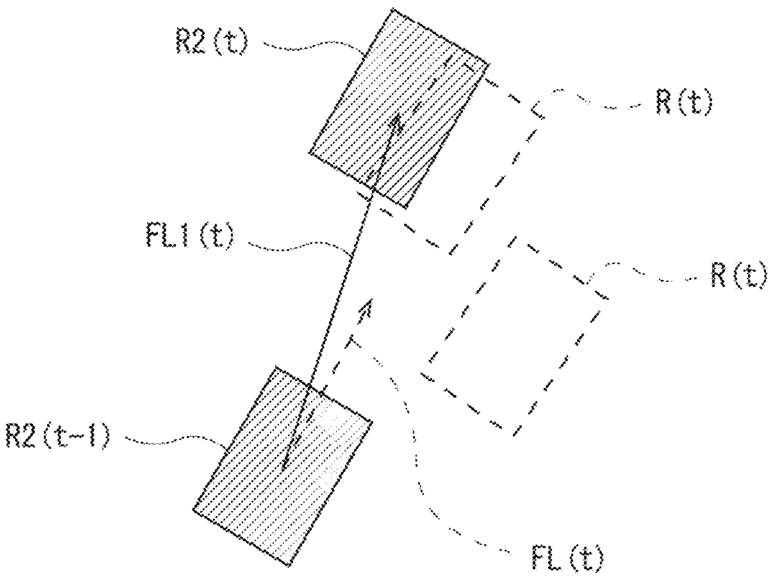
FIG. 11 is an explanatory diagram illustrating an example of a predicted occupancy region and a ground truth occupancy region.

The loss calculator 53 may calculate the loss parameter $L_O$ using equation EQ1. For example, the loss calculator 53 may calculate the loss parameter $L_O$ by calculating a cross entropy between the occupancy probability $OC_t$ (x, y) in the predicted occupancy data DOC related to the time t and the occupancy probability $OC2_t$ (x, y) in the ground truth occupancy data DOC2 related to the time t. The loss parameter $L_O$ may be an index indicating a degree of match between the predicted occupancy data DOC and the ground truth occupancy data DOC2. When the degree of match between the predicted occupancy data DOC and the ground truth occupancy data DOC2 is high, the loss calculator 53 may set the loss parameter $L_O$ to a small value. When the degree of match between the predicted occupancy data DOC and the ground truth occupancy data DOC2 is low, the loss calculator 53 may set the loss parameter $L_O$ to a high value. For example, in the example of FIG. 11, the higher the degree of match between the predicted occupancy region R (t) in the predicted occupancy data DOC and the ground truth occupancy region R2 (*t*) in the ground truth occupancy data DOC2, the smaller the value of the loss parameter $L_O$ may be set to by the loss calculator 53. The greater the difference between the predicted occupancy region R (t) and the ground truth occupancy region R2 (*t*), the higher the value of the loss parameter $L_O$ may be set to by the loss calculator 53.

Further, the loss calculator 53 may calculate the loss parameter $L_F$ using equation EQ2. For example, the loss calculator 53 may calculate a difference in the velocity, based on the velocity vector $FL_t$ (x, y) in the predicted flow data DFL related to the time t and the velocity vector $FL1_1$ (x, y) in the ground truth flow data DFL1 related to the time t. The loss calculator 53 may calculate the loss parameter $L_F$, based on the calculated difference in the velocity and the occupancy probability $OC2_t$ (x, y) in the ground truth occupancy data DOC2 related to the time t. The loss parameter $L_F$ may be an index indicating a degree of match between the predicted flow data DFL and the ground truth flow data DFL1. When the degree of match between the predicted flow data DFL and the ground truth flow data DFL1 is high, the loss calculator 53 may set the loss parameter $L_F$ to a small value. When the degree of match between the predicted flow data DFL and the ground truth flow data DFL1 is low, the loss calculator 53 may set the loss parameter $L_F$ to a high value. For example, in the example of FIG. 11, the higher the degree of match between the velocity vector FL (t) in the predicted flow data DFL and the velocity vector FL1 (*t*) in the ground truth flow data DFL1, the smaller the value of the loss parameter $L_F$ may be set to by the loss calculator 53. The greater the difference between the velocity vector FL (t) and the velocity vector FL1 (*t*), the higher the value of the loss parameter $L_F$ may be set to by the loss calculator 53.

Further, the loss calculator 53 may calculate the loss parameter $L_W$ using equations EQ3 and EQ4. For example, using equation EQ 3, the loss calculator 53 may generate occupancy probability $W_t$ in the occupancy data related to the time t, based on the occupancy probability $W_{t-1}$ in the occupancy data related to the time t−1 and the velocity vector $FL_t$ in the predicted flow data DFL related to the time t. Further, using equation EQ4, the loss calculator 53 may calculate the loss parameter $L_W$ by calculating a cross entropy between: a product of the occupancy probability $W_t$ (x, y) in the occupancy data related to the time t and the occupancy probability $OC_t$ (x, y) in the predicted occupancy data DOC related to the time t; and the occupancy probability $OC2_t$ (x, y) in the ground truth occupancy data DOC2 related to the time t. The loss parameter $L_W$ may be a flow trace loss and an index indicating a degree of match between the predicted data and the ground truth data related to both the occupancy data and the flow data. When the degree of match between the predicted data and the ground truth data is high, the loss calculator 53 may set the loss parameter $L_W$ to a small value. When the degree of match between the predicted data and the ground truth data is low, the loss calculator 53 may set the loss parameter $L_W$ to a high value.

The loss calculator 53 may calculate the loss parameter LOSS by performing weighted addition using a predetermined weight set to each of the loss parameters $L_O$, $L_F$, and $L_W$, based on the loss parameters $L_O$, $L_F$, and $L_W$ calculated as described above. The learning processor 51 may be configured to update a model parameter of the machine learning model to decrease the loss parameter LOSS by performing the backpropagation process.

The machine learning apparatus 40 may perform the machine learning process, based on the loss parameter $L_W$ related to both the occupancy data and the flow data in addition to the loss parameter $L_O$ related to the occupancy data and the loss parameter $L_F$ related to the flow data. This makes it possible for the machine learning apparatus 40 to improve accuracy of the machine learning process. In other words, because the data included in the data set DS includes noise, there is a possibility that learning accuracy is lowered due to the influence of the noise when, for example, the position and the velocity are individually learned simply using the loss parameter $L_O$ related to the occupancy data and the loss parameter $L_F$ related to the flow data. The machine learning apparatus 40 may perform the machine learning process, based on the loss parameter $L_W$ related to both the occupancy data and the flow data in addition to the loss parameters $L_O$ and $L_F$. This makes it possible for the machine learning apparatus 40 to easily learn a motion of the object for a longer period and improve the learning accuracy.

In one embodiment, the position data DPOS may serve as "position data". In one embodiment, the predicted occupancy data DOC may serve as "occupancy data". In one embodiment, the predicted flow data DFL may serve as "flow data". In one embodiment, the ground truth occupancy data DOC1 may serve as "first ground truth occupancy data". In one embodiment, the ground truth occupancy data DOC2 may serve as "second ground truth occupancy data". In one embodiment, the ground truth flow data DFL1 may serve as "ground truth flow data". In one embodiment, the loss parameter LOSS may serve as a "loss parameter". In one embodiment, the storage 42 may serve as a "storage". In one embodiment, the processor 41 may serve as a "processor".

[Operation and Workings]

Operation and workings of the surrounding environment recognition device 10 and the machine learning apparatus 40 according to the example embodiment will now be described.

Overview of Overall Operation

First, with reference to FIGS. 2, 7, and 9, an overview of an overall operation of the surrounding environment recognition device 10 and the machine learning apparatus 40 will be described.

In the surrounding environment recognition device 10, the object detector 21 of the image processor 20 may detect an object around the vehicle 1, based on captured images related to the same capturing point in time generated by the respective imagers 12. The object detector 21 may generate the position data DPOS, based on a result of the detection of the object around the vehicle 1. The prediction processor 22 may generate the predicted occupancy data DOC and the predicted flow data DFL by predicting the future position and the future velocity of the object using the machine learning model, based on the position data DPOS. For example, the position data memory 31 of the prediction processor 22 may store the position data DPOS supplied from the object detector 21 for the predetermined period. As a result, the pieces of position data DPOS related to the capturing points in time may be accumulated in the position data memory 31. The arithmetic processor 32 of the prediction processor 22 may generate the pieces of predicted occupancy data DOC related to points in time in the future and the pieces of predicted flow data DFL related to the points in time in the future using the machine learning model, based on the pieces of position data DPOS related to the capturing points in time. The output processor 23 may generate the prediction result RES, based on the pieces of predicted occupancy data DOC and the pieces of predicted flow data DFL supplied from the prediction processor 22.

In the machine learning apparatus 40, the learning processor 51 of the processor 41 may generate the pieces of predicted occupancy data DOC and the pieces of predicted flow data DFL using the machine learning model being trained, based on the pieces of position data DPOS included in the data set DS. The correction processor 52 may generate the pieces of ground truth occupancy data DOC2 by performing the correction process of expanding the ground truth occupancy region of the object, based on the pieces of ground truth occupancy data DOC1 included in the data set DS. The loss calculator 53 may calculate the loss parameter LOSS, based on the pieces of predicted occupancy data DOC supplied from the learning processor 51, the pieces of ground truth occupancy data DOC2 supplied from the correction processor 52, the pieces of predicted flow data DFL supplied from the learning processor 51, and the pieces of ground truth flow data DFL1 supplied from the storage 42. The learning processor 51 may update the machine learning model by performing the backpropagation process, based on the loss parameter LOSS supplied from the loss calculator 53.

Details of Operation

Figure 12:
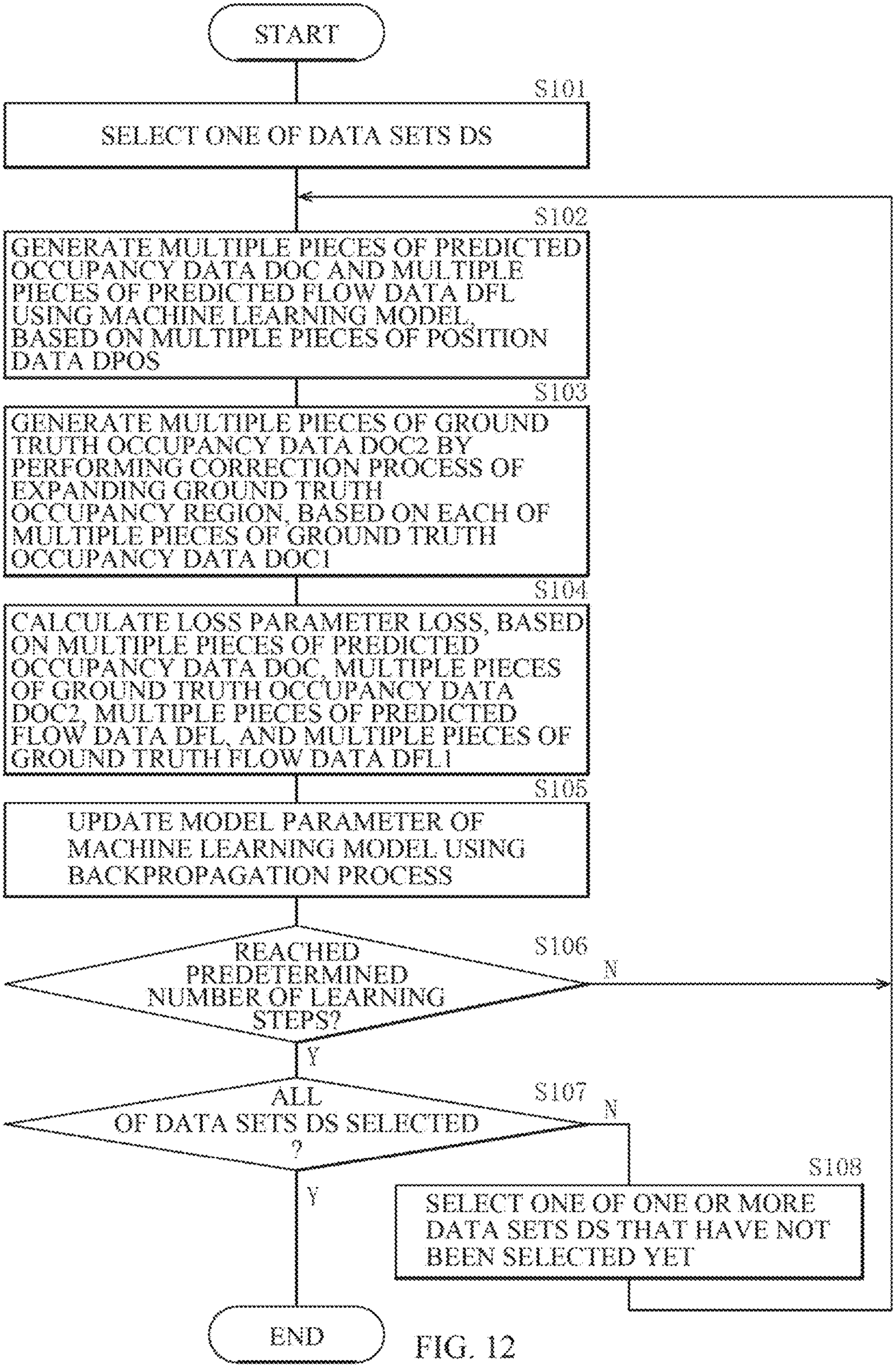
FIG. 12 is a flowchart illustrating an operation example of the processor illustrated in FIG. 9.

FIG. 12 illustrates an operation example of the machine learning apparatus 40. The machine learning apparatus 40 may generate the machine learning model by performing the machine learning process, based on the data sets DS. The operation will hereafter be described in detail.

First, the processor 41 may select one of the data sets DS stored in the storage 42 (step S101).

Thereafter, the learning processor 51 of the processor 41 may generate the pieces of predicted occupancy data DOC and the pieces of predicted flow data DFL using the machine learning model, based on the pieces of position data DPOS included in the selected data set DS (step S102).

Thereafter, the correction processor 52 of the processor 41 may generate the pieces of ground truth occupancy data DOC2 by performing the correction process of expanding the ground truth occupancy region of the object, based on each of the pieces of ground truth occupancy data DOC1 included in the selected data set DS (step S103). For example, as illustrated in FIG. 10A, the correction processor 52 may expand the ground truth occupancy region R1 included in the ground truth occupancy data DOC1 by a predetermined width in all directions. Alternatively, as illustrated in FIG. 10B, for example, the correction processor 52 may expand the ground truth occupancy region R1 by performing a blurring process on the ground truth occupancy data DOC1 using Gaussian blur.

Thereafter, the loss calculator 53 of the processor 41 may calculate the loss parameter LOSS, based on the pieces of predicted occupancy data DOC, the pieces of ground truth occupancy data DOC2, the pieces of predicted flow data DFL, and the pieces of ground truth flow data DFL1 (step S104).

Thereafter, the learning processor 51 of the processor 41 may update the model parameter of the machine learning model using the backpropagation process (step S105).

Thereafter, the processor 41 may check whether the number of learning steps that has been executed has reached the predetermined number of learning steps (step S106). When the number of learning steps that has been executed has not reached the predetermined number of learning steps yet ("N" in step S106), the processor 41 may repeat the processes of steps S102 to S106 until the predetermined number of learning steps is reached.

In step S106, when the number of learning steps that has been executed has reached the predetermined number of learning steps ("Y" in step S106), the processor 41 may check whether all of the data sets DS stored in the storage 42 have been selected (step S107). When not all of the data sets DS have been selected ("N" in step S107), the processor 41 may select one of the one or more data sets DS that have not been selected yet (step S108), and cause the process to return to step S102. The processor 41 may repeat the processes of steps S102 to S108 until all the data sets DS are selected.

In step S107, when all of the data sets DS stored in the storage 42 have been selected ("Y" in step S107), the process may be ended.

A machine learning model was generated using the machine learning method illustrated in FIG. 12. In this machine learning method, as illustrated in FIG. 10B, the ground truth occupancy data DOC2 was generated by subjecting the ground truth occupancy data DOC1 to the blurring process using Gaussian blur. The machine learning model thus generated was evaluated using the following three evaluation indices described in Reza Mahjourian, Jinkyu Kim, Yuning Chai, Mingxing Tan, Ben Sapp, Dragomir Anguelov, "Occupancy Flow Fields for Motion Forecasting in Autonomous Driving", [online], Waymo LLC, [retrieved on Jun. 22, 2023], Internet <URL: https://arxiv.org/pdf/2203.03875.pdf>.

Flow End Point Error

Vehicle Observed AUC

Vehicle Warped Occupancy AUC

Results of the three evaluation indices for the machine learning model generated using the machine learning method illustrated in FIG. 12 were better than results of the three evaluation indices for the machine learning model generated by the method disclosed in Reza Mahjourian, Jinkyu Kim, Yuning Chai, Mingxing Tan, Ben Sapp, Dragomir Anguelov, "Occupancy Flow Fields for Motion Forecasting in Autonomous Driving", [online], Waymo LLC, [retrieved on Jun. 22, 2023], Internet <URL: https://arxiv.org/pdf/2203.03875.pdf>.

As described above, the machine learning method performed by the machine learning apparatus 40 includes a first process, a second process, a third process, and a fourth process. The first process includes inputting the pieces of position data DPOS to the machine learning model. The machine learning model is configured to receive the pieces of position data DPOS indicating a position of an object at respective first points in time, and output occupancy data (the predicted occupancy data DOC) and flow data (the predicted flow data DFL). The occupancy data (the predicted occupancy data DOC) includes map data indicating the occupancy probability of the object at a second point in time later than the first points in time. The flow data (the predicted flow data DFL) includes map data indicating the velocity vector of the object at the second point in time. The second process includes generating second ground truth occupancy data (the ground truth occupancy data DOC2) by performing a process of expanding the occupancy region of the object on first ground truth occupancy data (the ground truth occupancy data DOC1). The first ground truth occupancy data (the ground truth occupancy data DOC1) includes the ground truth data of map data indicating the occupancy probability of the object at the second point in time. The third process includes calculating the loss parameter LOSS, based on the occupancy data (the predicted occupancy data DOC) outputted from the machine learning model, the second ground truth occupancy data (the ground truth occupancy data DOC2), the flow data (the predicted flow data DFL) outputted from the machine learning model, and ground truth flow data (the ground truth flow data DFL1) including the ground truth data of map data indicating the velocity vector of the object at the second point in time. The fourth process includes updating the machine learning model, based on the loss parameter LOSS. As described above, because the ground truth occupancy data DOC2 is generated by performing the process of expanding the occupancy region of the object, it is possible for the machine learning process to be performed allowing a slight difference between the predicted occupancy data DOC and the ground truth occupancy data DOC2. For example, the future position and the future velocity of a vehicle can change depending on a driving operation of a driver who drives the vehicle. Accordingly, performing the machine learning process while allowing a slight difference as described above makes it possible to enhance generalization performance. As a result, the machine learning method makes it possible to improve the accuracy in predicting the position and the velocity of the object.

In some embodiments, as illustrated in FIG. 10A, in the second process, the second ground truth occupancy data (the ground truth occupancy data DOC2) may be generated by expanding the occupancy region by a predetermined amount. As a result, the machine learning method makes it possible to enhance the generalization performance with a simple method and improve the accuracy in predicting the position and the velocity of the object.

In some embodiments, as illustrated in FIG. 10B, in the second process, the second ground truth occupancy data (the ground truth occupancy data DOC2) may be generated by performing a blurring process on the first ground truth occupancy data (the ground truth occupancy data DOC1). As a result, probability density in the ground truth occupancy data DOC2 may be highest in the vicinity of the center of the ground truth occupancy region R2. This makes it easier for the loss parameter LOSS to change in accordance with an amount of difference between the ground truth occupancy region R2 and the predicted occupancy region R. Accordingly, the machine learning method makes it possible to improve the accuracy in predicting the position and the velocity of the object.

Example Effects

As described above, the machine learning method and the machine learning apparatus according to the example embodiment include the first process, the second process, the third process, and the fourth process. The first process includes inputting the pieces of position data to the machine learning model. The machine learning model is configured to receive the pieces of position data indicating a position of an object at respective first points in time, and output occupancy data and flow data. The occupancy data includes map data indicating the occupancy probability of the object at a second point in time later than the first points in time. The flow data includes map data indicating the velocity vector of the object at the second point in time. The second process includes generating second ground truth occupancy data by performing a process of expanding the occupancy region of the object on first ground truth occupancy data. The first ground truth occupancy data includes the ground truth data of map data indicating the occupancy probability of the object at the second point in time. The third process includes calculating the loss parameter, based on the occupancy data outputted from the machine learning model, the second ground truth occupancy data, the flow data outputted from the machine learning model, and ground truth flow data including the ground truth data of map data indicating the velocity vector of the object at the second point in time. The fourth process includes updating the machine learning model, based on the loss parameter. This helps to improve the accuracy in predicting the position and the velocity of the object.

In some embodiments, in the second process, the second ground truth occupancy data may be generated by expanding the occupancy region by a predetermined amount. This helps to improve the accuracy in predicting the position and the velocity of the object.

In some embodiments, in the second process, the second ground truth occupancy data may be generated by performing a blurring process on the first ground truth occupancy data. This helps to improve the accuracy in predicting the position and the velocity of the object.

Modification Example 1

In the above-described example embodiment, the correction processor 52 may generate the pieces of ground truth occupancy data DOC2, based on the pieces of ground truth occupancy data DOC1; however, this example is a non-limiting example. In some embodiments, the pieces of ground truth occupancy data DOC2 may be generated based on the pieces of ground truth occupancy data DOC1 and the pieces of ground truth flow data DFL1. The modification example 1 will hereafter be described in detail.

Figure 13:
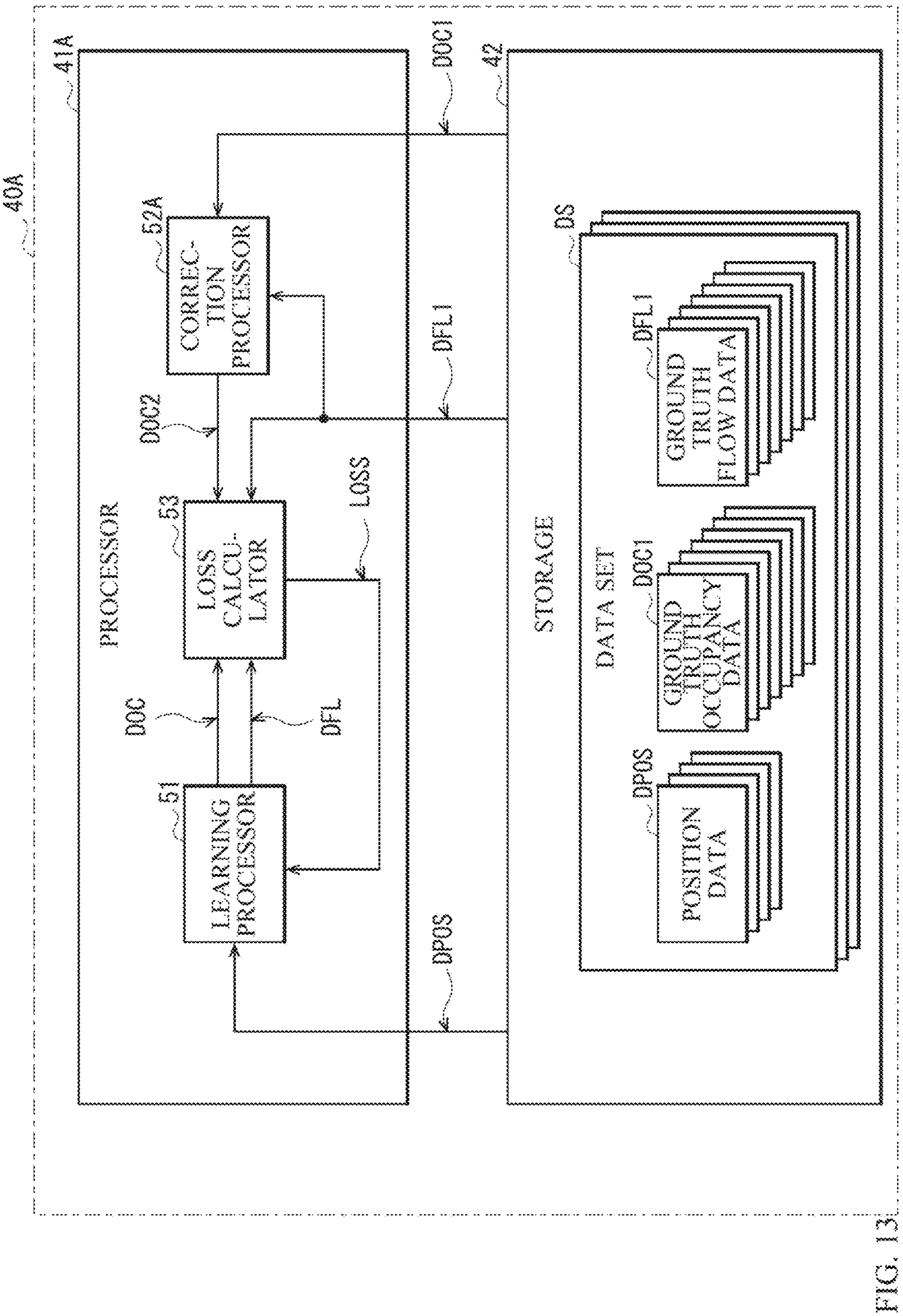
FIG. 13 is a block diagram illustrating a configuration example of a processor according to a modification example.

FIG. 13 illustrates a configuration example of a machine learning apparatus 40A according to the modification example 1. The machine learning apparatus 40A includes a processor 41A. The processor 41A may include a correction processor 52A. The correction processor 52A may be configured to generate the pieces of ground truth occupancy data DOC2 by performing the correction process of expanding the ground truth occupancy region of the object, based on the pieces of ground truth occupancy data DOC1 and the pieces of ground truth flow data DFL1 included in the data set DS.

Figure 14A:
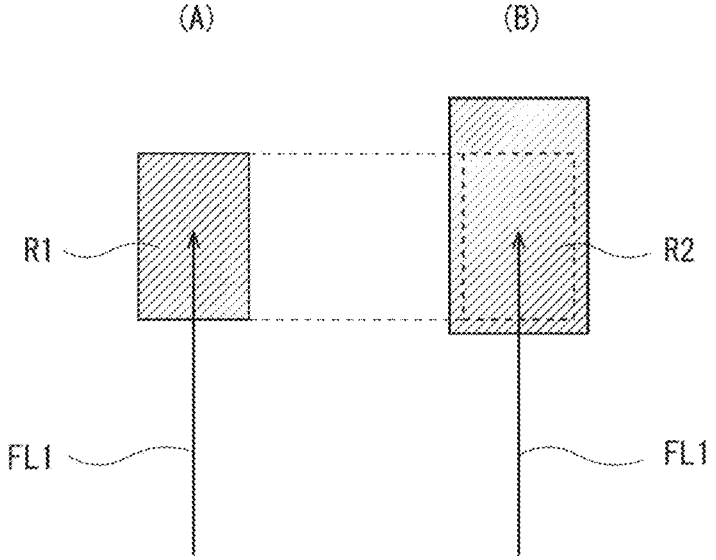
FIG. 14A is an explanatory diagram illustrating an operation example of a correction processor illustrated in FIG. 13.

FIG. 14A illustrates an operation example of the correction processor 52A, where (A) illustrates the ground truth occupancy region R1 in the ground truth occupancy data DOC1, and (B) illustrates the ground truth occupancy region R2 in the ground truth occupancy data DOC2. In this example, the correction processor 52A may expand the ground truth occupancy region R1 included in the ground truth occupancy data DOC1 in accordance with the velocity vector FL1 included in the ground truth flow data DFL1. For example, the correction processor 52A may generate the ground truth occupancy region R2 by expanding the ground truth occupancy region R1 in the direction of the velocity vector FL1 by an amount corresponding to the magnitude of the velocity vector FL1 and in directions other than the direction of the velocity vector FL1 by a predetermined width. In other words, because the larger the velocity vector FL1, the larger the change in the position of the object, the correction processor 52A may expand the ground truth occupancy region R1 by an amount corresponding to the magnitude of the velocity vector FL1 in the direction of the velocity vector FL1. The occupancy probability in the ground truth occupancy region R2 may be "1".

Figure 14B:
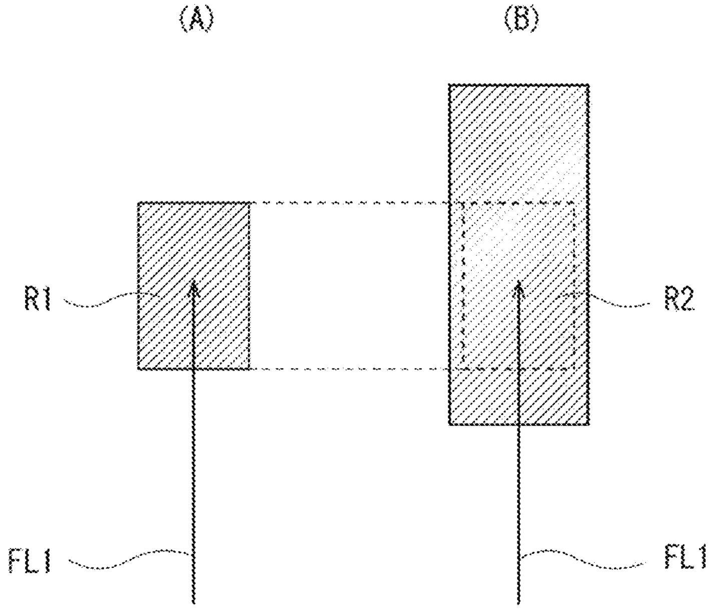
FIG. 14B is an explanatory diagram illustrating another operation example of the correction processor illustrated in FIG. 13.

FIG. 14B illustrates another operation example of the correction processor 52A, where (A) illustrates the ground truth occupancy region R1 in the ground truth occupancy data DOC1, and (B) illustrates the ground truth occupancy region R2 in the ground truth occupancy data DOC2. For example, the correction processor 52A may generate the ground truth occupancy region R2 by expanding the ground truth occupancy region R1 in the direction of the velocity vector FL1 by an amount corresponding to the magnitude of the velocity vector FL1, in a direction opposite to the direction of the velocity vector FL1 by an amount corresponding to the magnitude of the velocity vector FL1, and in other directions by a predetermined width. The occupancy probability in the ground truth occupancy region R2 may be "1".

Figure 14C:
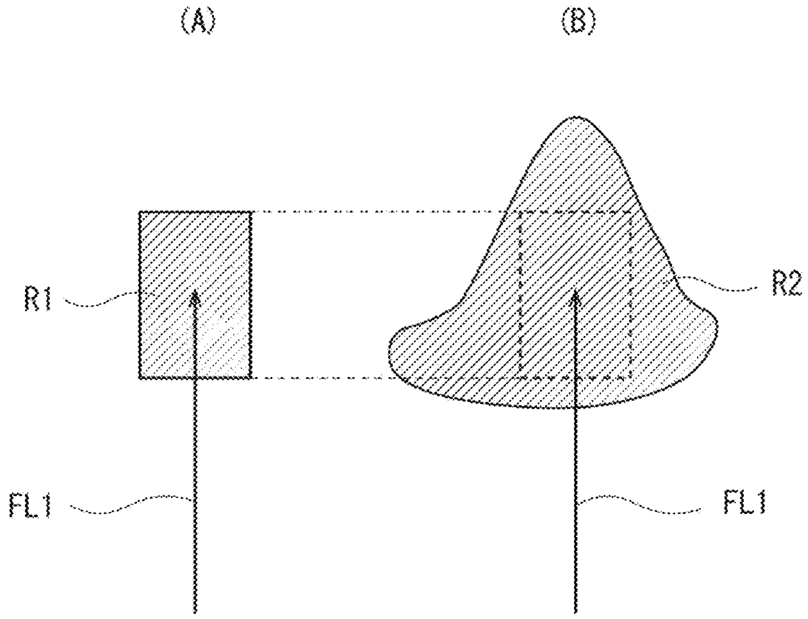
FIG. 14C is an explanatory diagram illustrating another operation example of the correction processor illustrated in FIG. 13.

FIG. 14C illustrates another operation example of the correction processor 52A, where (A) illustrates the ground truth occupancy region R1 in the ground truth occupancy data DOC1, and (B) illustrates the ground truth occupancy region R2 in the ground truth occupancy data DOC2. For example, the correction processor 52A may set the ground truth occupancy region R2 at the position of the ground truth occupancy region R1. For example, the ground truth occupancy region R2 may be set by taking a statistic of moving directions and moving amounts of vehicles in advance. In this example, the ground truth occupancy region R2 may extend in the direction of the velocity vector FL1 and in two directions that intersect the velocity vector FL1. The occupancy probability in the ground truth occupancy region R2 may be "1".

Modification Example 2

In the above-described example embodiment, the object may be the vehicle; however, this example is a non-limiting example. In some embodiments, the object may be a pedestrian.

Modification Example 3

In the above-described example embodiment, as illustrated in FIG. 4, the map data indicating the position of the object around the vehicle 1 may be used as the position data DPOS; however, this example is anon-limiting example. Various pieces of data indicating the position of the object around the vehicle 1 may be used as the position data DPOS. In some embodiments, the occupancy data may be used as the position data DPOS, or the coordinate data of the object around the vehicle 1 may be used as the position data DPOS.

[Other Modifications]

Further, any two or more of these modifications may be combined with each other.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the above-described example embodiment, the predicted occupancy data DOC may include the map data indicating the occupancy probability of the object at a certain point in time in the future with reference to the position of the vehicle 1; however, this example is a non-limiting example. In some embodiments, the predicted occupancy data DOC may include the map data indicating the occupancy probability of the object in global coordinates on earth.

For example, in the above-described example embodiment, the predicted flow data DFL may include the map data indicating the velocity vector of the object at a certain point in time in the future with reference to the position of the vehicle 1; however, this example is a non-limiting example. In some embodiments, the predicted flow data DFL may include the map data indicating the velocity vector of the object in global coordinates on earth.

For example, in the above-described example embodiment, the future position and the future velocity of the object around the vehicle 1 traveling on a road surface may be predicted; however, this example is a non-limiting example. In some embodiments, the future position and the future velocity of the object around a flying object may be predicted. The flying object may include, for example, a flying vehicle, a helicopter, a drone, and any object having flying capability.

The example effects described herein are mere examples, and example effects of the disclosure are therefore not limited to those described herein, and other example effects may be achieved.

Furthermore, the disclosure may encompass at least the following embodiments.

(1) A machine learning method including:

inputting pieces of position data to a machine learning model, the machine learning model being configured to receive the pieces of position data indicating a position of an object at respective first points in time, and output occupancy data and flow data, the occupancy data including map data indicating occupancy probability of the object at a second point in time later than the first points in time, the flow data including map data indicating a velocity vector of the object at the second point in time;

generating second ground truth occupancy data by performing a process of expanding an occupancy region of the object on first ground truth occupancy data, the first ground truth occupancy data including ground truth data of map data indicating occupancy probability of the object at the second point in time;

calculating a loss parameter, based on the occupancy data outputted from the machine learning model, the second ground truth occupancy data, the flow data outputted from the machine learning model, and ground truth flow data including ground truth data of map data indicating a velocity vector of the object at the second point in time; and updating the machine learning model, based on the loss parameter.

(2) The machine learning method according to (1), in which the generating the second ground truth occupancy data includes generating the second ground truth occupancy data by expanding the occupancy region by a predetermined amount.

(3) The machine learning method according to (1) or (2), in which the generating the second ground truth occupancy data includes generating the second ground truth occupancy data by performing a blurring process on the first ground truth occupancy data.

(4) The machine learning method according to any one of (1) to (3), in which the generating the second ground truth occupancy data includes generating the second ground truth occupancy data by expanding the occupancy region, based on the velocity vector included in the ground truth flow data.

(5) A machine learning apparatus including:

a storage configured to store a data set including pieces of position data indicating a position of an object at respective first points in time, first ground truth occupancy data including ground truth data of map data indicating occupancy probability of the object at a second point in time later than the first points in time, and ground truth flow data including ground truth data of map data indicating a velocity vector of the object at the second point in time; and a processor configured to perform a machine learning process, based on the data set, in which the processor is configured to input the pieces of position data to a machine learning model configured to receive the pieces of position data and output occupancy data and flow data, the occupancy data including map data indicating occupancy probability of the object at the second point in time, the flow data including map data indicating a velocity vector of the object at the second point in time, generate second ground truth occupancy data by performing a process of expanding an occupancy region of the object on the first ground truth occupancy data, calculate a loss parameter, based on the occupancy data outputted from the machine learning model, the second ground truth occupancy data, the flow data outputted from the machine learning model, and the ground truth flow data, and update the machine learning model, based on the loss parameter.

Each of the processor 41 and the processor 41A illustrated in FIGS. 9 and 13 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the processor 41 and the processor 41A. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the processor 41 and the processor 41A illustrated in FIGS. 9 and 13.

The invention claimed is:

1. A machine learning method for training a machine learning model, the method comprising:

obtaining a data set including pieces of position data, first ground truth occupancy data, and ground truth flow data, the pieces of position data indicating respective positions of one or more objects at respective first points in time, the first ground truth occupancy data comprising ground truth map data indicating occupancy probabilities of the one or more objects at a second point in time later than the first points in time, the first ground truth occupancy data including one or more ground truth occupancy regions, the ground truth flow data comprising ground truth map data indicating respective velocity vectors of the one or more objects at the second point in time;

inputting the pieces of position data to the machine learning model to generate predicted occupancy data and predicted flow data, the predicted occupancy data comprising map data indicating predicted occupancy probabilities of the one or more objects at the second point in time, the predicted flow data comprising map data indicating predicted velocity vectors of the one or more objects at the second point in time;

generating, before calculating a loss parameter, second ground truth occupancy data by expanding the one or more ground truth occupancy regions to generate one or more expanded ground truth occupancy regions, the second ground truth occupancy data including the one or more expanded ground truth occupancy regions;

calculating the loss parameter based on the predicted occupancy data, the second ground truth occupancy data, the predicted flow data, and the ground truth flow data, the calculating including calculating an occupancy loss by comparing the predicted occupancy data with the second ground truth occupancy data and calculating a flow loss by comparing the predicted flow data with the ground truth flow data; and updating model parameters of the machine learning model, based on the loss parameter.

2. The machine learning method according to claim 1, wherein the generating the second ground truth occupancy data comprises generating the second ground truth occupancy data by expanding each of the one or more ground truth occupancy regions by a predetermined amount.

3. The machine learning method according to claim 1, wherein the generating the second ground truth occupancy data comprises generating the second ground truth occupancy data by performing a blurring process on the first ground truth occupancy data.

4. The machine learning method according to claim 1, wherein the generating the second ground truth occupancy data comprises generating the second ground truth occupancy data by expanding each of the one or more ground truth occupancy regions based on a corresponding one of the respective velocity vectors indicated by the ground truth flow data.

5. The machine learning method according to claim 1, wherein the calculating the flow loss comprises calculating a velocity difference between a predicted velocity vector indicated by the predicted flow data and a ground truth velocity vector indicated by the ground truth flow data, and weighting the velocity difference using an occupancy probability indicated by the second ground truth occupancy data.

6. The machine learning method according to claim 1, wherein the updating model parameters of the machine learning model comprises updating the model parameters by a backpropagation process.

7. The machine learning method according to claim 2, wherein the one or more ground truth occupancy regions are expanded by a predetermined width in all directions.

8. The machine learning method according to claim 4, wherein each of the one or more ground truth occupancy regions is expanded in a direction of a corresponding velocity vector indicated by the ground truth flow data by an amount corresponding to a magnitude of the corresponding velocity vector.

9. The machine learning method according to claim 8, wherein each of the one or more ground truth occupancy regions is expanded in directions other than the direction of the corresponding velocity vector by a predetermined width.

10. A machine learning apparatus comprising:

a storage configured to store a data set including pieces of position data, first ground truth occupancy data, and ground truth flow data, the pieces of position data indicating respective positions of one or more objects at respective first points in time, the first ground truth occupancy data comprising ground truth map data indicating occupancy probabilities of the one or more objects at a second point in time later than the first points in time, the first ground truth occupancy data including one or more ground truth occupancy regions, the ground truth flow data comprising ground truth map data indicating respective velocity vectors of the one or more objects at the second point in time; and a processor configured to perform a machine learning process, based on the data set, wherein the processor is configured to:

input the pieces of position data to a machine learning model to generate predicted occupancy data and predicted flow data, the predicted occupancy data comprising map data indicating predicted occupancy probabilities of the one or more objects at the second point in time, the predicted flow data comprising map data indicating predicted velocity vectors of the one or more objects at the second point in time, generate, before calculating a loss parameter, second ground truth occupancy data by expanding the one or more ground truth occupancy regions to generate one or more expanded ground truth occupancy regions, the second ground truth occupancy data including the one or more expanded ground truth occupancy regions, calculate the loss parameter based on the predicted occupancy data, the second ground truth occupancy data, the predicted flow data, and the ground truth flow data, the calculating including calculating an occupancy loss by comparing the predicted occupancy data with the second ground truth occupancy data and calculating a flow loss by comparing the predicted flow data with the ground truth flow data, and update model parameters of the machine learning model, based on the loss parameter.

* * * * *